Feb. 14, 1928. 1,659,372
A. NAGEL
LIQUID MEASURING DEVICE
Filed Dec. 4, 1923 2 Sheets-Sheet 1

Inventor:
August Nagel
by  Attorney.

Feb. 14, 1928.

A. NAGEL 1,659,372

LIQUID MEASURING DEVICE

Filed Dec. 4, 1923   2 Sheets-Sheet 2

Inventor:
August Nagel

Patented Feb. 14, 1928.

1,659,372

UNITED STATES PATENT OFFICE.

AUGUST NAGEL, OF STUTTGART, GERMANY.

LIQUID-MEASURING DEVICE.

Application filed December 4, 1923, Serial No. 678,548, and in Germany March 23, 1923.

My invention relates to liquid measuring devices of the kind in which an upper valve and a lower valve are connected with each other by a rod and actuated by a float in such a manner that they are alternately opened and closed, such device being for instance shown and described in my copending application for patent of the United States for "Liquid measuring device", filed Sept. 12, 1923, Serial No. 662,268.

It is an object of my present invention to ensure tight closing of the valves under the action of the weighted lever, or tumble weight, which forms part of the mechanism. It is a further object to obviate the unfavorable effect exerted by the entering liquid on the liquid distributing disc arranged above the float mentioned. A still further object is to prevent the controlling means for the entering liquid from being affected by foreign bodies carried along with the liquid.

In order to attain the first of these objects, I provide toggle-levers actuated by pins projecting forth from the tumble weight, as well as a rotary segment connected with the tumble weight and meshing with the gearing actuated by the float. One of the toggle-lever arms is supported elastically, the other arm is pivoted to a single-armed lever engaging with its free end a sleeve or oblong collar attached to the rod connecting the two valves. This mechanism serves to press the valve which shall be closed firmly on its seat until the mechanism is released by the tumble weight.

In order to attain the second object, the liquid distributing disc is firmly secured to a stationary part on top of the device, and the inlet ports are located above it. In order to attain the third result, this top member is devised as a valve body in which a collecting chamber for foreign bodies is formed, a sieve being provided above this chamber and inserted in the passage or channel extending from the liquid supply pipe to the inlet valve, as will be more fully described hereinafter.

In the drawings affixed to this specification and forming part thereof a device embodying my invention is illustrated diagrammatically by way of example. In the drawings Figure 1 is a vertical section, the float being shown in its upper position and in side-view, part of its wall being broken away.

Figure 1:
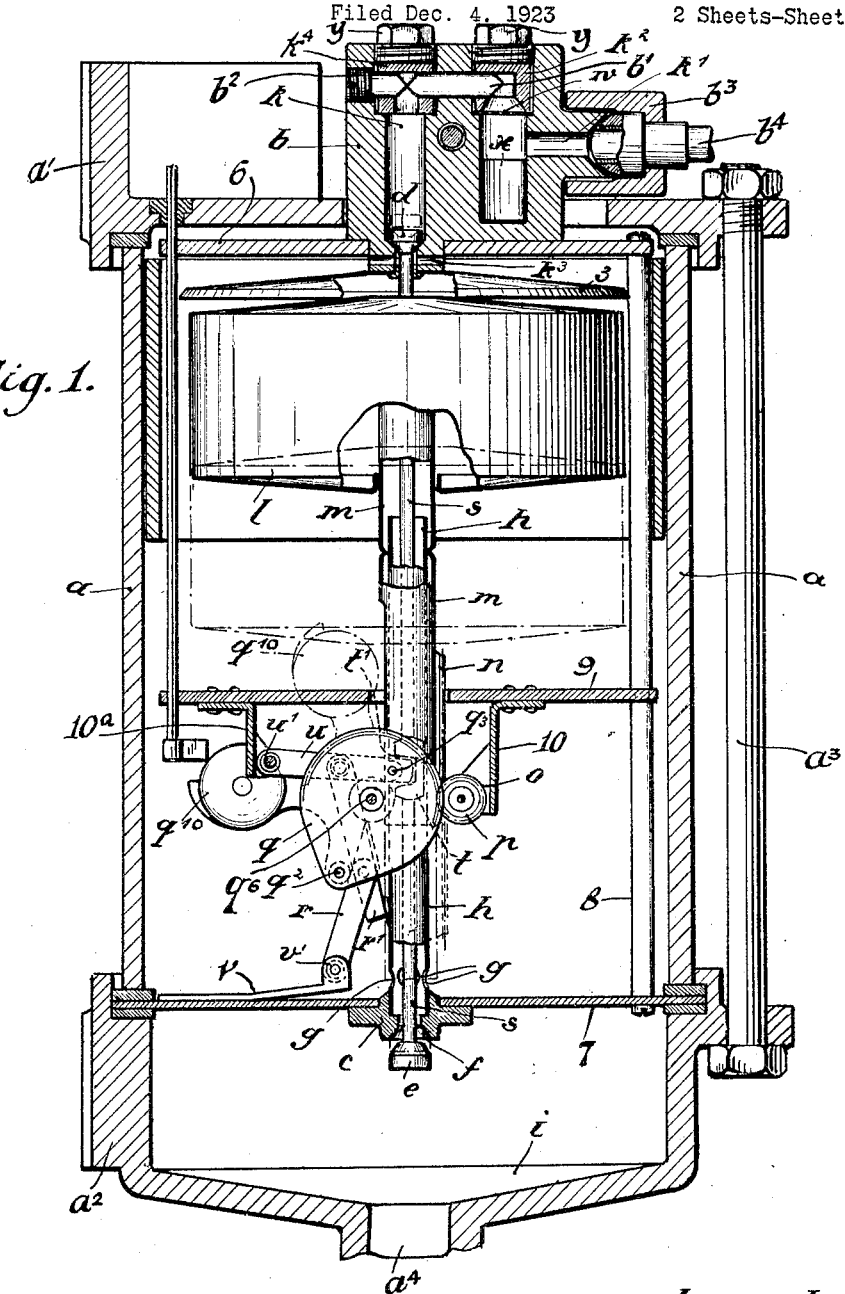

Referring to the drawings, the casing of the liquid measuring device consists of the cylinder $a$, a cover $a^1$ and a bottom $a^2$ which are connected with each other by bolts $a^3$. Through a central aperture of the cover $a^1$ extends a valve body $b$, the bottom of which carries a disc 6 connected by rods 8 with a plate 7 clamped between the cylinder $a$ and the bottom $a^2$. The valve body $b$ is thus mounted on the plate 7 by the intermediary of the rods 8 and the disc 6.

In the valve body $b$ is provided a vertical chamber $k$ which forms at its lower end a seat for the inlet-valve $d$. This valve is secured to the upper end of a valve rod $s$ which extends vertically through two telescopically arranged tubes $m$ and $h$, the former of which extends through the float $l$ and is fixed thereto, whereas the tube $h$ is supported on the plate 7. At the lower end of this tube are provided some apertures $g$. To the lower end of the valve rod $s$ which extends through the tube $h$ and through the plate 7, is attached the outlet valve $e$ for which a seat $f$ is formed in a member $c$ fixed to the plate 7. The length of the rod $s$ is such that the valve $e$ is opened when the valve $d$ is closed (Fig. 1) and vice versa (Fig. 2).

With the rods 8 is connected a horizontal plate 9 from which are suspended brackets 10 and $10^a$. The bracket 10 carries a short horizontal spindle 11 (Fig. 3) to which are fixed two pinions $o$ and $p$. Pinion $o$ meshes with a vertical rack $n$ (Figs. 1 and 2) secured to the tube $m$ of the float $l$. Pinion $p$ meshes with the cogged circular part of an eccentric segment $q$ fixed to one end of a short horizontal spindle $q^6$ supported in projections of the tube $h$. The tube $m$ is slotted at its lower end so as to move freely on the tube $h$ in vertical direction. Tube $h$ is also slotted, an arm $u$ hinged at $u^1$ to the bracket $10^a$ extending through the slot. The free end of this arm engages a U-shaped collar $t$ secured to the valve rod $s$. The arm $u$ is connected with the upper lever $r^1$ of a pair of toggle-levers $r$ $r^1$. Lever $r$ is jointed at $v^1$ to a flat spring $v$ secured to plate 7.

The upper links $r^1$ of the toggle-lever systems are connected at their upper ends by a pin $u^2$ which at the same time serves for connecting the toggle-levers with the arm $u$.

Figure 2:
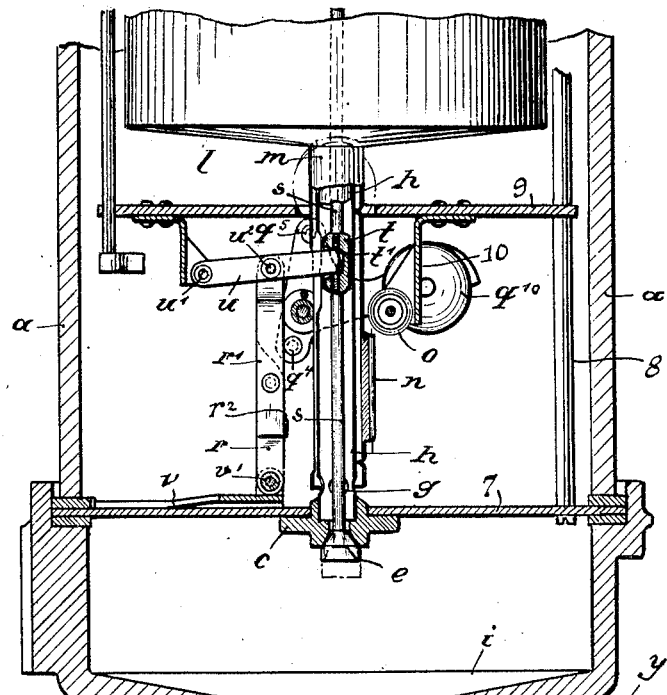
Figure 2 shows the lower half of Figure 1 with the float in its lower position.
Figure 3:
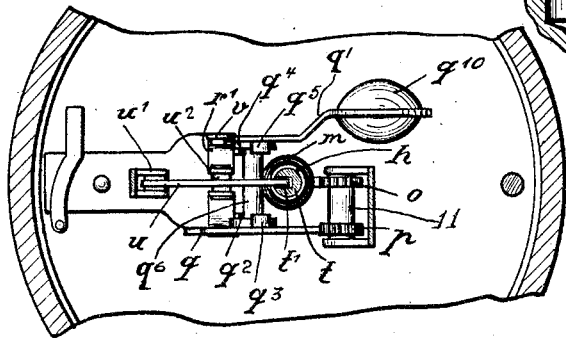
Figure 3 is a horizontal section taken between the disc 9 and the weight $g^{10}$ in Fig. 2, some parts of the cylinder being broken away.

The other end of shaft $q^6$ to which the eccentric segment $q$ is fixed, is connected with a lever $q^1$ carrying a weight $q^{10}$ and co-operating with one of the toggle-levers, while segment $q$ co-operates with the other toggle-lever in such a manner that these levers are alternately bent (Fig. 1) and stretched (Fig. 2). To this effect segment $q$ is provided with pins $q^2$ $q^3$ (Fig. 1) located diametrically opposite to one another, and the double-armed tumble weight $q^1$ carries similar pins $q^4$ $q^5$ (Fig. 3). The pins $q^2$, $q^5$ effect the bending, pins $q^3$ $q^4$ the stretching or straightening of the toggle-levers. This latter movement of the toggle-levers is limited by angular projections $r^2$ provided at the lower ends of the lever-arms $r^1$, and, while motion in this direction proceeds, spring $v$ is placed under tension, as shown in Fig. 2 where the parts are shown in the position where the float $l$ is in its lowermost position, valve $e$ being closed and cylinder $a$ being ready to be refilled. When the cylinder has been filled, the float $l$ assumes its uppermost position and the toggle-levers are bent, as shown in Fig. 1. In this position of the toggle-levers, the position of the tumble weight $q^1$ is such that its weight $q^{10}$ is located on the left (Fig. 1) of the levers, whereas in the opposite position, the weight is located on the right (Figs. 2 and 3).

In the valve body $b$, there is provided besides the vertical chamber $k$, another vertical chamber in which a sieve $w$ is inserted which is pressed upon its seat by a member $k^2$ secured in place by a threaded plug $v$. A similar member $k^3$ and a similar plug $y^1$ are arranged above the chamber $k$. The channels provided in the members $k^2$ and $k^3$ are connected with each other by a conduit $b^1$. Co-axially with the conduit $b^1$ is arranged a threaded plug $b^2$ which can be removed when the conduit $b^1$ is to be cleaned. The communication between the two chambers in the valve-body $b$ can be interrupted by turning either member $k^2$ or member $k^3$. Below the sieve $w$ is a collecting chamber $x$ for the solid matter retained by the sieve.

The liquid to be measured is supplied to the device through the pipe $b^4$ (Fig. 1) which is connected with the valve body by a nut $b^3$ and through a conduit $k^1$.

The seat of valve $b$ extends through the plate 6 and is here provided with horizontal passages $k^3$ through which the liquid flows onto a distributing disc 3 located above the float $l$ and rigidly secured to the downwardly projecting part of the valve body $b$.

Figure 4:
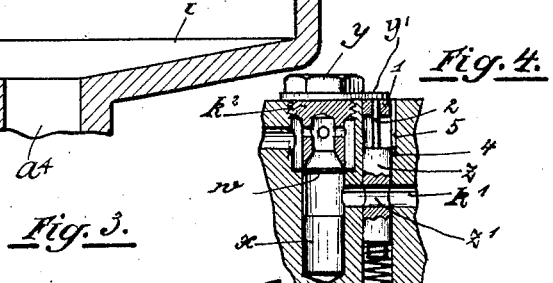
Figure 4 shows a detail relating to the means for retaining impurities.

In the modification illustrated in Fig. 4, means are provided whereby the conduit $k^1$ is automatically closed when the threaded plug $y$ is removed in order to get access to the member $k^2$. A small plunger $z$ (Fig. 4) having a cross-bore $z^1$ is located co-axially to the conduit $k^1$. Below the plunger $z$ is arranged a spring $z^2$ which tends to press it upwards, this being normally prevented by a pin 2 extending upwards from the plunger, and held down by a lateral extension of the flange $y^1$ of the threaded plug $y$, pin 2 being guided in a plug 1. The plunger is secured against rotation by a lateral projection 4 engaging a groove 5. Obviously, the conduit $k^1$ is closed automatically by the spring $z^2$ whenever the flange $y^1$ of the plug $y$ releases the pin 2.

The manner of operation of the liquid measuring device above described is as follows:—

Supposing the float $l$ to be lifted by the liquid flowing into the cylinder $a$ and to have nearly reached the end of its upward stroke, the rack $n$ is just about to release the pinion $o$. The tumble weight $q^1$ has been turned from the right to the left, while the float was rising, and its weight $q^{10}$ may be supposed to have reached the position indicated in dotted lines in Figure 1. The weight $q^{10}$ is now about to be thrown over but is retained as long as it is coupled with the rack by means of the spindle $q^6$, the eccentric disc $q$, the pinion $p$, the spindle 11, and the pinion $o$. However, at the moment where this indirect coupling is disengaged, that is to say, when the rack $n$ releases the pinion $o$, the weight $q^{10}$ can drop and can suddenly turn to the left together with its lever $q^1$ but, as the tumble weight $q^{10}$ is connected with the segment $q$ by spindle $q^6$, segment $q$ is rotated and its pin $q^2$ and the pin $q^5$ on the weighted lever $q^1$ strike the toggle levers $r$, $r^1$ and cause them to bend as shown in Fig. 1, whereby the arm $u$ is caused to drop together with the valve rod $s$ connected with it by the sleeve or oblong collar $t$. Owing to the valve-rod $s$ dropping, the upper valve $d$ is closed and valve $e$ is opened, and the liquid can escape through the apertures of the guide-tube $h$ and through the orifice $a^4$ in the bottom $a^2$.

As the float descends with the level of the liquid, the rack $n$ comes into gear again with the pinion $o$, whereby spindle 11, pinion $p$, segment $q$, spindle $q^6$ and tumble weight $q^1$ $q^{10}$ are set moving. The toggle-levers remain in their bent position, being retained therein by spring $v$. The weight $q^{10}$ gradually moves to the other side, but is allowed to drop only after the float has reached the end of its downward stroke, that is to say, when the rack has again released the pinion o. The dropping of the weight causes the pin $q^3$ on the segment $q$ and the pin $q^5$ on the weighted lever $q^1$ to strike the toggle levers $r$, $r^1$ so that as to cause them to be stretched (Fig. 2), whereby arm 4 is raised and is caused to lift also the valve rod with the valves. The discharge of liquid at $f$ is now interrupted and, at the same time, the inlet valve $d$ is opened to allow a fresh supply of liquid to enter the cylinder $a$.

This cycle of operations is repeated automatically as long as the communication between the supply pipe $b^4$ and the chamber $k$ is not interrupted, this being effected either by rotating one of the members $k^4$ or $k^2$ or automatically by the plunger $z$ (Fig. 4).

I wish it to be understood that I do not desire to be limited to the exact details of construction shown and described, for obvious modifications will occur to a person skilled in the art.

I claim:—

1. A liquid measuring device comprising an inlet and an outlet valve, a spindle connecting said valves and adapted to be displaced axially to open one and to close the other valve, a tumble weight, a float, a rack operatively connected with said float and also with said tumble weight so as to raise said weight above its dead-centre position upon upward motion of said float, and mechanism operatively connected with said tumble weight and said spindle so as to displace said spindle when said tumble weight has been released by said rack and has moved from its dead-centre position.

2. A liquid measuring device comprising an inlet and an outlet valve, a spindle connecting said valves and adapted to be displaced axially to open one and to close the other valve, a tumble weight, a float, a rack operatively connected with said float and also with said tumble weight so as to raise said weight above its dead-centre position upon upward motion of said float, and mechanism operatively connected with said tumble weight and said spindle and including a toggle lever, means connected with said tumble weight for alternately bending and stretching said toggle lever so as to displace said spindle when said tumble weight has been released by said rack and has moved from its dead-centre position.

3. A liquid measuring device comprising an inlet and an outlet valve, a spindle connecting said valves and adapted to be displaced axially to open one and to close the other valve, a tumble weight, a float, a rack operatively connected with said float and also with said tumble weight so as to raise said weight above its dead-centre position upon upward motion of said float, and mechanism operatively connected with said tumble weight and said spindle and including a toothed segment adapted to mesh with said rack which is coaxial and oppositely connected with said tumble weight, and a toggle lever means connected with said tumble weight for alternately bending and stretching said toggle lever so as to displace said spindle when said tumble weight has been released by said rack and has moved from its dead-centre position.

4. A liquid measuring device comprising an inlet and an outlet valve, a spindle connecting said valves and adapted to be displaced axially to open one and to close the other valve, a tumble weight, a float, a rack operatively connected with said float and also with said tumble weight so as to raise said weight above its dead-centre position upon upward motion of said float, and mechanism operatively connected with said tumble weight and said spindle and including a toggle lever, a toothed segment adapted to mesh with said rack, which segment is coaxial and operatively connected with said tumble weight, a pair of pins on said segment, a pair of pins on said weight, and a toggle lever adapted to be bent by the pins of one pair and to be stretched by those of the other, so as to displace said spindle when said tumble weight has been released by said rack and has moved from its dead-centre position.

5. Liquid measuring device comprising an inlet and an outlet valve, means for alternately closing one and opening the other valve, a liquid supply, means providing communication between said supply and said inlet valve, removable means for inspecting the interior of said communicating means, a sieve and a settling tank arranged in said communicating means for removal after removing said inspecting means and means for interrupting said liquid supply, said interrupting means being operatively connected with said inspecting means, so that said interrupting means comes into operation upon removal of the removable inspecting means.

6. Liquid measuring device comprising an inlet and an outlet valve, means for alternately closing one and opening the other valve, a liquid supply, means providing communication between said supply and said inlet valve, removable means for inspecting the interior of said communicating means, a sieve and a settling tank arranged in said communicating means for removal after removing said inspecting means, and a spring-actuated piston valve for interrupting said liquid supply, said piston-valve being operatively connected with said inspecting means, so that said piston valve comes into operation upon removal of the removable inspecting means.

In testimony whereof I affix my signature.

AUGUST NAGEL.